(12) United States Patent
Huang et al.

(10) Patent No.: US 11,738,285 B2
(45) Date of Patent: Aug. 29, 2023

(54) EXTERNAL CIRCULATING SLURRY REACTIVE CRYSTALLIZER

(71) Applicants: QINGDAO INSTITUTE OF BIOENERGY AND BIOPROCESS TECHNOLOGY, CHINESE ACADEMY OF SCIENCES, Shandong (CN); INSTITUTE OF PROCESS ENGINEERING, CHINESE ACADEMY OF SCIENCES, Beijing (CN)

(72) Inventors: Qingshan Huang, Shandong (CN); Aqiang Chen, Shandong (CN); Hang Xiao, Shandong (CN); Shujun Geng, Shandong (CN); Chao Yang, Beijing (CN)

(73) Assignees: QINGDAO INSTITUTE OF BIOENERGY AND BIOPROCESS TECHNOLOGY, CHINESE ACADEMY OF SCIENCES, Shandong (CN); INSTITUTE OF PROCESS ENGINEERING, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/250,238

(22) PCT Filed: Feb. 18, 2020

(86) PCT No.: PCT/CN2020/075779
§ 371 (c)(1),
(2) Date: Dec. 21, 2020

(87) PCT Pub. No.: WO2021/163906
PCT Pub. Date: Aug. 26, 2021

(65) Prior Publication Data
US 2022/0379236 A1 Dec. 1, 2022

(51) Int. Cl.
*B01D 9/00* (2006.01)
*B01D 19/00* (2006.01)
(Continued)

(52) U.S. Cl.
CPC .......... *B01D 9/004* (2013.01); *B01D 9/0036* (2013.01); *B01D 9/0059* (2013.01);
(Continued)

(58) Field of Classification Search
CPC .... B01D 9/004; B01D 9/0036; B01D 9/0059; B01D 19/0068; B01D 21/267;
(Continued)

(56) References Cited

U.S. PATENT DOCUMENTS

2019/0209991 A1* 7/2019 Huang .................... B01J 8/007

FOREIGN PATENT DOCUMENTS

| CN | 106334500 A | 1/2017 |
| CN | 206428007 U | 8/2017 |

(Continued)

*Primary Examiner* — Huy Tram Nguyen
(74) *Attorney, Agent, or Firm* — Wolter Van Dyke Davis PLLC; Erica M. Cipparone

(57) ABSTRACT

Disclosed is an external circulating slurry reactive crystallizer, including a riser, a degassing zone and a downcomer. A lower end of the riser is communicated with a gas inlet pipe, a liquid inlet pipe and a solid feeding pipe, while an upper end of the riser is communicated with a lower end of the degassing zone. An upper end of the downcomer is integrally fixed to a sidewall of the degassing zone. At least one hydrocyclone is arranged at a lower end of the downcomer. The hydrocyclone is provided with an overflow port at an upper end thereof and an underflow port and a valve at a lower end thereof. The overflow port is communicated with the riser. The crystallizer can simultaneously realize reaction, crystallization and separation for continuous pro- (Continued)

duction with low cost, regulating and controlling the particle size distribution and morphology of crystals.

11 Claims, 2 Drawing Sheets

(51) Int. Cl.
*B01D 21/26* (2006.01)
*B01J 4/00* (2006.01)
*B01J 10/00* (2006.01)

(52) U.S. Cl.
CPC ....... *B01D 19/0068* (2013.01); *B01D 21/267* (2013.01); *B01J 4/002* (2013.01); *B01J 10/00* (2013.01); *B01D 2009/0086* (2013.01); *B01J 2204/002* (2013.01)

(58) Field of Classification Search
CPC ......... B01D 2009/0086; B01D 19/0042; B01J 4/002; B01J 10/00; B01J 2204/002; B01J 2208/00991; B01J 19/2465; B01J 14/00
USPC ....................................................... 422/209
See application file for complete search history.

(56) References Cited

FOREIGN PATENT DOCUMENTS

| | | | |
|---|---|---|---|
| CN | 109621479 A | 4/2019 | |
| CN | 110508219 A | * 11/2019 | .......... B01J 19/2435 |

* cited by examiner

EXTERNAL CIRCULATING SLURRY REACTIVE CRYSTALLIZER

CROSS-REFERENCE TO RELATED APPLICATIONS

This application is the US National Stage of International Application No. PCT/CN2020/075779 filed 2 Feb. 2020, claims the benefit thereof, and is incorporated by reference herein in its entirety.

TECHNICAL FIELD

The disclosure relates to the field of chemical equipment, and in particular, to an external circulating slurry reactive crystallizer.

BACKGROUND

The slurry reactive crystallization refers to the process of a chemical reaction between a gas and a liquid or between liquids to generate indissolvable or insoluble solid phase substances, where the gas can be used as a reactant or an auxiliary carrier gas to provide mixing power. Reactive crystallization technology can be used both for producing the desired industrial products and for separation and purification. The morphology and particle size distribution of crystallized products have important effects on their physical and chemical properties and product functions. Different particle size distributions or morphologies of the same chemical substance may lead to greatly different physical and chemical properties and different final uses thereof.

In the prior art, a stirred tank or a bubble column reactor is used industrially for reactive crystallization in most situations, but the crystallized products produced by these two types of reactors have the defects of wide particle size distribution and poor morphology. Moreover, the mechanical agitation in the stirred tank may greatly disturb the reactive crystallization process, which is prone to influencing the natural growth of a crystallized product and particularly not conducive to the growth of non-spherical crystals. Besides, the crystallized product is prone to adhering to the agitating blade, resulting in reduced agitation efficiency. Stirred tank reactors are typically high in energy consumption. It is necessary to transport a crystallized product from a reactive crystallizer to a separator outside of the reactor for solid-liquid separation so as to obtain a solid-phase crystal product, where the solid-liquid separation is mostly realized through various filtration-based processes, but the filtration process is prone to blockage, resulting in discontinuous production; moreover, additional power equipment is required to return the crystallization mother liquor to the reactor so as to realize circulation thereof, which further increases operating costs and also leads to instable production.

The patent No. 106334500A provides an external circulating reactor capable of reaction, heat exchange and separation, where a hydrocyclone is installed at the bottom of a downcomer of the external circulating reactor, so that a clean product can flow out of an overflow port under the combined action of the density difference between liquid and solid phases and separation by the hydrocyclone with no need for extra power, with the solid-containing slurry returning to the riser through the lower downcomer to react continuously. Moreover, excellent heat exchange performance of the external circulating reactor is retained. However, this invention is only applicable to gas-liquid-solid slurry catalytic reaction requiring continuous circulation of a solid catalyst, but not to a system where the gas-liquid-solid reaction finally generates a crystallized product and a system where a crystal product needs to be removed from the reactor.

The patent No. CN109621479A provides a process for producing 400 μm ammonium perchlorate crystals by feeding a refined ammonium perchlorate solution into an insulated tank, feeding the ammonium perchlorate solution in the insulated tank into a crystallizer, and controlling a feeding rate according to the crystallization process so that the ammonium perchlorate solution in the crystallizer maintains stable supersaturation with a slurry concentration of 37%-42%. The ammonium perchlorate solution in the crystallizer is circulated through an external cooler and returned to the crystallizer using a circulating pump, with a circulating volume of 170-200 $m^3/h$. The temperature of the solution is kept at 26-28° C., so that the generated crystal nucleus grows in a circulating pipe, and the range of fine banded crystals is controlled to be 0.2-2.0%. The crystals having a satisfactory particle size in the crystallizer are discharged intermittently for a plurality of times through a discharging pump. However, the heat exchange process of the reactive crystallization requires a circulating pump to convey the slurry to an external heat exchanger, which increases the equipment cost; the product is intermittently discharged for multiple times, so that stable and continuous production cannot be realized. In addition, the wide particle size distribution of the crystallized product is a problem that cannot be solved by the process.

The patent No. CN206428007U discloses a plant for producing granular medicinal sodium bicarbonate, which includes a dissolving tank, and a carbonization crystallizer housed in a jacketed heat exchanger, with a feeding port I and a feeding port II formed in an upper cover, a discharging port formed in the bottom, and a stirrer arranged inside. The dissolving tank is communicated with the carbonization crystallizer through the feeding port I by means of a pipe; a steel cylinder is communicated with the carbonization crystallizer through the feeding port II; a suction filter is communicated with the carbonization crystallizer through the discharging port by means of a pipe; the jacketed heat exchanger of the crystallizer is connected to a temperature controller of the crystallizer; a jacketed heat exchanger of the dissolving tank is connected to a temperature controller of the dissolving tank. According to this invention, the stirrer and the temperature controller are used for controlling process parameters such as sodium bicarbonate reaction rate, crystallization solid-liquid ratio and residence time to provide suitable growing conditions and sufficient growth time for the growth of sodium bicarbonate crystals so as to achieve the effect of increasing the particle size of products. The plant can control reactive crystallization conditions to increase the particle size of the generated crystal product, but solid-liquid separation is realized through suction filtration using a suction filter outside the crystallizer. Similarly, the process fails to adjust the particle size distribution of the crystallized product and to obtain a product with a certain specific particle size distribution.

From the foregoing, the processes of reactive crystallization, crystal separation, mother liquor return and the like in an existing reactive crystallizer cannot be realized in the same reactor, and energy consumption and cost are increased because of multiple processes; secondly, the common separation process such as filtration or sedimentation may fail to obtain products in a desired particle size range, have the problem of wide particle size distribution in crystal products, and be not applicable to products with high crystal particle size selectivity.

SUMMARY

An objective of the disclosure is to provide an external circulating slurry reactive crystallizer, which solves the problems mentioned above in the prior art, so that the external circulating slurry reactive crystallizer can simultaneously realize reaction, crystallization and separation, allowing for a reduction in operating cost and continuous production. Moreover, the crystallizer is adaptable to different crystal particle size distribution ranges and reactor throughputs; the crystallized products in the reactive crystallizer can be effectively separated; accurate regulation and control on crystal particle size distribution and morphology can be realized by accurately controlling operating conditions.

To achieve the above object, the disclosure provides the following solution.

The disclosure provides an external circulating slurry reactive crystallizer, including a riser, a degassing zone and a downcomer. A lower end of the riser is communicated with a gas inlet pipe, a liquid inlet pipe and a solid feeding pipe, while an upper end of the riser is communicated with a lower end of the degassing zone, which is open at the top. An upper end of the downcomer is integrally fixed to a sidewall of the degassing zone and the downcomer is communicated with the interior of the degassing zone. At least one hydrocyclone is arranged at a lower end of the downcomer and the downcomer is communicated with the hydrocyclone. The hydrocyclone is provided with an overflow port at an upper end thereof and an underflow port and a valve at a lower end thereof. The valve is used for controlling the flow rate of the underflow port. The overflow port is communicated with the riser, thereby allowing a crystallization mother liquor containing a small-particle crystallized product to enter the riser through the overflow port.

Preferably, the gas inlet pipe is arranged on the bottom surface of the riser and extends from the bottom surface of the riser in a direction away from the riser. The liquid inlet pipe is arranged on a sidewall of the riser and close to the gas inlet pipe, and extends from the sidewall of the riser in a direction away from the riser. The solid feeding pipe, which is located above the liquid inlet pipe and tilted, extends from the sidewall of the riser in a direction away from the riser and the liquid inlet pipe.

Preferably, an integrated gas-liquid distributor is arranged at the bottom of the riser to disperse an incoming gas from the gas inlet pipe and an incoming liquid from the liquid inlet pipe.

Preferably, a dispersion shell is arranged on the integrated gas-liquid distributor. A liquid inlet is formed in one sidewall of the dispersion shell, by which the liquid inlet pipe is communicated with the interior of the dispersion shell. A plurality of intercommunicating holes is uniformly formed in the top surface of the dispersion shell, by which the dispersion shell is communicated with the riser. An aeration needle is correspondingly arranged in each intercommunicating hole, and the bottom end of the aeration needle is fixed to the bottom surface of the dispersion shell, while a top end of the aeration needle extends upwards through the intercommunicating hole. The aeration needles allow the gas inlet pipe and the riser to communicate with each other. The aeration needle has a diameter smaller than an inner diameter of the intercommunicating hole.

Preferably, the degassing zone includes a transition section in the form of a hollow inverted circular truncated cone and an expansion section in the form of a hollow cylinder. The riser is also in the form of a hollow cylinder. The expansion section has an inner diameter larger than that of the riser. A lower end of the transition section is integrally fixed to and internally communicated with the upper end of the riser. A lower end surface of the transition section has an inner diameter equaling to that of an upper end surface of the riser. An upper end of the transition section is integrally fixed to and internally communicated with a lower end of the expansion section. An upper end surface of the transition section has an inner diameter equaling to that of the expansion section. The lower end of the expansion section is higher than the upper end of the downcomer, and the upper end of the expansion section is open.

Preferably, the upper end of the riser is flush with the lower end of the transition section.

Preferably, the upper end of the riser extends into the degassing zone, and is higher than the lower end of the transition section and the end of the downcomer that connected to the degassing zone.

Preferably, the downcomer includes an inclined section and a vertical section. An upper end of the inclined section is integrally fixed to and internally communicated with the sidewall of the degassing zone, while a lower end of the inclined section is smoothly and integrally fixed to and internally communicated with an upper end of the vertical section. The lower end of the vertical section is further communicated with the upper end of the hydrocyclone, thereby allowing a slurry in the downcomer to enter the hydrocyclone through the upper end of the hydrocyclone for solid-liquid separation.

Preferably, the overflow port is formed in the center of the hydrocyclone, and an overflow pipe is arranged above the overflow port. The overflow pipe extends from the overflow port in a direction away from the hydrocyclone and is communicated with the riser through a connecting pipe. An end connected to the overflow pipe of the connecting pipe is higher than the other end connected to the riser of the connecting pipe. The valve is arranged above the underflow port.

Preferably, two hydrocyclones are used.

Compared with the prior art, the disclosure has the following technical effects.

The external circulating slurry reactive crystallizer provided in the disclosure includes a riser, a degassing zone and a downcomer, where the riser is used for reactants to ascend upwards, while the degassing zone is used for discharging redundant gas to the outside. The lower end of the riser is communicated with a gas inlet pipe, a liquid inlet pipe and a solid feeding pipe to feed raw reaction material into the riser. The upper end of the riser is communicated with the lower end of the degassing zone, and an opening is formed in the top of the degassing zone to discharge the redundant gas. The upper end of the downcomer is integrally fixed to and communicated with the sidewall of the degassing zone, and the downcomer is communicated with the interior of the degassing zone, allowing the degassed reactants to enter the downcomer. At least one hydrocyclone is arranged at the lower end of the downcomer, and the downcomer is communicated with the hydrocyclone in which solid-liquid separation is carried out to obtain a crystallized product in a desired particle size range. An overflow port is arranged at the upper end of the hydrocyclone, while an underflow port and a valve are arranged at the lower end of the hydrocyclone, where the valve is used for controlling the flow rate of the underflow port. The flow rate of the underflow port is adjusted to be consistent with the feed flow rate so as to keep the liquid level in the external circulating slurry reactive crystallizer constant. The overflow port is communicated with the riser, allowing the crystallization mother liquor containing small-particle crystallized products to enter the riser through the overflow port to react again. Thus, reaction, crystallization and separation can be realized in one container, allowing for cost reduction. Besides, the desired particle size range is controlled by the hydrocyclone, so that the particle size distribution and the morphology of the crystals are accurately regulated and controlled.

BRIEF DESCRIPTION OF THE DRAWINGS

To explain the technical solutions in examples of the disclosure or in the prior art more clearly, the accompanying drawings needed in the examples will be briefly introduced below. Obviously, the drawings in the following description are only some examples of the disclosure, and other drawings can be derived by those of ordinary skill in the art from these drawings without creative work.

Figure 1:
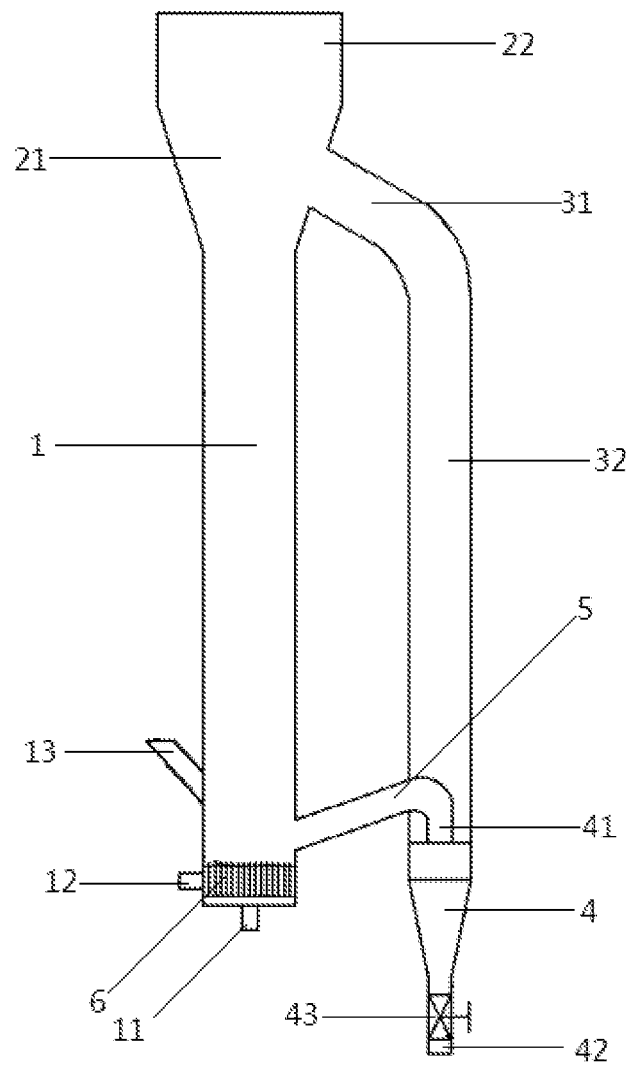
FIG. 1 is a schematic structure diagram of an external circulating slurry reactive crystallizer in Example 1.

In the drawings: 1—riser, 11—gas inlet pipe, 12—liquid inlet pipe, 13—solid feeding pipe, 21—transition section, 22—expansion section, 31—inclined section, 32—vertical section, 41—overflow pipe, 42—underflow port, 43—valve, 5—connecting pipe, and 6—aeration needle.

DETAILED DESCRIPTION

The technical solutions in the examples of the disclosure will be clearly and completely described below in conjunction with the accompanying drawings in the examples of the disclosure. Obviously, the described examples are only a part of the examples of the present disclosure, rather than all the examples. All other examples obtained by one of ordinary skill in the art from the examples of the disclosure without creative work shall fall within the protection scope of the disclosure.

An objective of the disclosure is to provide an external circulating slurry reactive crystallizer to solve the technical problems, such as high energy consumption due to the failure to realize reaction, crystallization and separation processes in the same reactor, wide particle size distribution range of crystal products, and the failure to regulate and control the particle size distribution and morphology accurately.

To provide a better understanding of the above objective, features and advantages of the disclosure, the disclosure will be further described below with reference to the accompanying drawings and specific examples.

Example 1

As shown in FIG. 1, this example provides an external circulating slurry reactive crystallizer which includes a riser 1, a degassing zone and a downcomer. The riser 1 is used for reactants to ascend upwards, and the degassing zone is used for discharging redundant gas to the outside. The lower end of the riser 1 is communicated with a gas inlet pipe 11, a liquid inlet pipe 12 and a solid feeding pipe 13 to feed raw reaction materials into the riser 1. The upper end of the riser 1 is communicated with the lower end of the degassing zone, and an opening is formed in the top of the degassing zone to discharge the redundant gas. The upper end of the downcomer is integrally fixed to the sidewall of the degassing zone, and the downcomer is communicated with the interior of the degassing zone, allowing the degassed reactants to enter the downcomer. At least one hydrocyclone is arranged at the lower end of the downcomer, and the downcomer is communicated with the hydrocyclone in which solid-liquid separation is performed to obtain a crystallized product in a desired particle size range. The hydrocyclone is provided with an overflow port at an upper end thereof and an underflow port 42 and a valve 43 at a lower end thereof. The valve 43 is used for controlling the flow of the underflow port 42. The flow of the underflow port 42 is adjusted to be consistent with the feed flow to keep the liquid level in the external circulating slurry reactive crystallizer constant. The overflow port is communicated with the riser 1, allowing the crystallization mother liquor containing a small-particle crystallized product to enter the riser 1 through the overflow port to react again. Thus, reaction, crystallization and separation can be realized in one container, allowing for cost reduction. Besides, the desired particle size range is controlled by the hydrocyclone, so that the particle size distribution and the morphology of the crystals are accurately regulated and controlled.

Specifically, the gas inlet pipe 11 is arranged on the bottom surface of the riser 1 and extends from the bottom surface of the riser 1 in a direction away from the riser 1. The required reaction gas is bubbled into the riser 1 through the gas inlet pipe 11. The liquid inlet pipe 12 is arranged on the sidewall of the riser 1 and close to the gas inlet pipe 11, and extends from the sidewall of the riser 1 in a direction away from the riser 1, and the liquid inlet pipe 12 is used for feeding the required reaction liquid. The solid feeding pipe 13, which is located above the liquid inlet pipe 12 and tilted, extends from the sidewall of the riser 1 in a direction far away from the riser 1 and the liquid inlet pipe 12, so that the added solid raw material can slide into the riser 1 to react after entering the solid feeding pipe 13, thereby preventing the blockage of the solid feeding port.

An integrated gas-liquid distributor is arranged at the bottom of the riser 1 to disperse an incoming gas from the gas inlet pipe 11 and an incoming liquid from the liquid inlet pipe 12, allowing for full reaction and preventing the influence of non-uniform gas-liquid mixing on the reaction efficiency.

A dispersion shell is arranged on the integrated gas-liquid distributor. A liquid inlet is formed in a sidewall of the dispersion shell, by which the liquid inlet pipe 12 is communicated with the interior of the dispersion shell, and a plurality of intercommunicating holes is uniformly formed in the top surface of the dispersion shell, by which the dispersion shell is communicated with the riser 1. An aeration needle 6 is correspondingly arranged in each intercommunicating hole. The bottom end of the aeration needle 6 is fixed to the bottom surface of the dispersion shell, while the top end of the aeration needle 6 extends upwards through the intercommunicating hole. The aeration needles 6 allow the gas inlet pipe 11 and the riser 1 to communicate with each other, and each aeration needle 6 has a diameter smaller than the inner diameter of the intercommunicating hole. The gas bubbled from the gas inlet pipe 11 reaches above the dispersion shell through the aeration needles 6, and the liquid fed from the liquid inlet pipe 12 reaches above the dispersion shell through the intercommunicating holes; thus, the gas and liquid phases are dispersed and the reaction efficiency is improved. During actual production and use, a person skilled in the art would be able to determine whether to use an integrated gas-liquid distributor according to actual production requirements. When an integrated gas-liquid distributor is used, a person skilled in the art can also change the inner diameters of the intercommunicating hole and the aeration needle 6 according to actual requirements to achieve a better gas-liquid dispersion effect.

The degassing zone includes a transition section 21 and an expansion section 22. The transition section 21 is in the form of a hollow inverted circular truncated cone, while the expansion section 22 is in the form of a hollow cylinder, and the riser 1 is also in the form of a hollow cylinder. The inner diameter of the expansion section 22 is larger than that of the riser 1. The lower end of the transition section 21 is integrally fixed to and internally communicated with the upper end of the riser 1. The inner diameter of the lower end surface of the transition section 21 is equal to that of the upper end surface of the riser 1. The upper end of the transition section 21 is integrally fixed to and internally communicated with the lower end of the expansion section 22. The inner diameter of the upper end face of the transition section 21 is equal to the inner diameter of the expansion section 22. The lower end of the expansion section 22 is higher than the upper end of the downcomer and the expansion section 22 is open at the upper end thereof, which is conducive to slurry flow into the downcomer. However, the degassing zone in the external circulating slurry reactive crystallizer provided by the disclosure is not limited to the above arrangement as long as it can achieve the degassing effect and does not prevent slurry from flowing into the downcomer.

The upper end of the riser 1 is flush with the lower end of the transition section 21.

The downcomer includes an inclined section 31 and a vertical section 32. The upper end of the inclined section 31 is integrally fixed to and internally communicated with the sidewall of the degassing zone, and the lower end of the inclined section 31 is smoothly and integrally fixed to and internally communicated with the upper end of the vertical section 32, thereby facilitating the flow of the degassed slurry in the riser 1 into the vertical section 32 along the inclined section 31 for next step of solid-liquid separation. The lower end of the vertical section 32 is communicated with the upper end of the hydrocyclone, allowing the slurry in the downcomer to enter the hydrocyclone through the upper end of the hydrocyclone for the solid-liquid separation. In actual use, a person skilled in the art can add a heat exchanger on the outer side of the riser 1 or the downcomer and can decide its specific size based on the desired heat exchange amount to achieve a better effect.

The overflow port is formed in the center of the hydrocyclone, and an overflow pipe 41 is arranged above the overflow port, which extends from the overflow port in a direction away from the hydrocyclone and is communicated with the riser 1 through a connecting pipe 5. One end, connected to the overflow pipe 41 of the connecting pipe 5 is higher than the other end connected to the riser 1 of the connecting pipe 5. A valve 43 is arranged above the underflow port 42. The hydrocyclone is provided with separation power by the directional flow in the external circulating reactive crystallizer with no need for extra power. A person skilled in the art would select the size of the hydrocyclone according to the actual desired crystal particle size range in production. When the slurry reaches the hydrocyclone, solid-liquid separation is performed under the action of centrifugal force. The heavy phase crystals having a particle size above the desired range flow out of the underflow port 42, and the light phase crystals having a particle size below the desired one return to the riser 1 through the overflow port to circulate for reactive crystallization, so that the particle size range of the crystallized product can be precisely controlled. Specifically, the riser 1 has a height of 5 m and an inner diameter of 0.4 m, while the downcomer has a height of 4.4 m and an inner diameter of 0.3 m, and the degassing zone has a height of 0.4 m and a diameter of 0.8 m at an upper end thereof. There are 200 intercommunicating holes, each having a diameter of 5 mm. The aeration needle 6 has an inner diameter of 0.6 mm. The hydrocyclone has a diameter of 60 mm.

Taking the production of sodium bicarbonate as an example, a saturated solution of sodium carbonate and $CO_2$ gas were separately fed via the liquid inlet pipe 12 and the gas inlet pipe 11, through the integrated gas-liquid distributor to the riser 1. The reaction temperature was controlled to be 75° C., and the saturated solution of sodium carbonate and the $CO_2$ gas were mixed for reactive crystallization. The slurry moved upwards to the degassing zone for degassing, and the degassed slurry entered the downcomer to flow downwards into the hydrocyclone in which the slurry entering via the inlet of the hydrocyclone was subjected to solid-liquid separation under the action of centrifugal force. A heavy phase component containing sodium bicarbonate crystals having a particle size above 270 meshes was discharged through the underflow port 42, and a light phase component containing sodium bicarbonate having a particle size below 270 meshes was returned through the overflow port of the hydrocyclone to the riser 1 to circulate for reactive crystallization. As a result, a crystal product having a desired particle size could be obtained. Besides, the valve 43 was adjusted so that the discharge flow rate was equal to the feed flow rate to maintain a constant liquid level in the reactor.

Example 2

Figure 2:
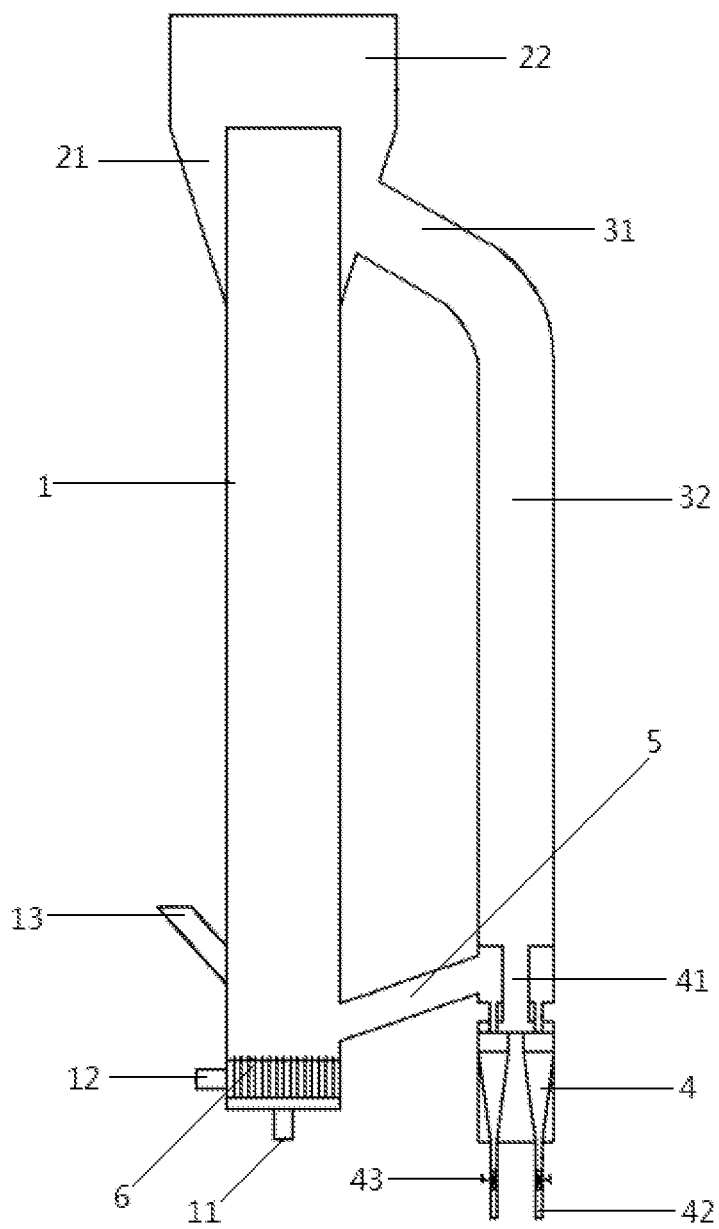
FIG. 2 is a schematic structure diagram of an external circulating slurry reactive crystallizer in Example 2.

This example differs from Example 1 in that: as shown in FIG. 2, the upper end of the riser 1 extends into the degassing zone, and the upper end of the riser 1 is higher than the lower end of the transition section 21 and the end connected to the degassing zone of the downcomer, so that the degassing effect of the degassing zone can be improved; the slurry moves upwards and overflows to the degassing zone from the riser 1 for sufficient degassing, preventing that excessive entrained bubbles enter the hydrocyclone from the downcomer to affect the separation performance of the hydrocyclone. In addition, in actual use, a person skilled in the art would be able to adjust the relative positions of the bottom surface of the degassing zone and the top surface of the riser 1 according to the desired degassing degree.

Two hydrocyclones are used. However, the number of the hydrocyclones in the external circulating slurry reactive crystallizer provided by the disclosure is not limited to two, and a person skilled in the art would be able to make adaptive changes to the number and specific dimensions of hydrocyclones according to a crystal amount and a mixing degree as required in practice so as to meet the actual requirements and improve the production efficiency.

Specifically, the riser 1 has a height of 7 m and an inner diameter of 0.55 m, while the downcomer has a height of 6.3 m and an inner diameter of 0.4 m, and the degassing zone has a height of 0.5 m and a diameter of 1 m at a top surface thereof which is 0.2 m away from the top end of the riser 1. There are 300 intercommunicating holes, each having a diameter of 4 mm. The aeration needle 6 has an inner diameter of 0.9 mm Two hydrocyclones connected in parallel are arranged at the bottom of the downcomer, both of which are 30 mm in diameter.

Taking the production of calcium carbonate whiskers as an example, calcium carbonate crystals in different particle size ranges are different in use. $Ca(OH)_2$ saturated solution and a gas containing 2% $CO_2$ were separately fed via the liquid inlet pipe 12 and the gas inlet pipe 11, through the integrated gas-liquid distributor to the riser 1. The reaction temperature was controlled to be 85° C. and the pH value was 8.9. The $Ca(OH)_2$ saturated solution and the carbon dioxide gas were mixed for reactive crystallization to generate calcium carbonate whiskers. The slurry moved upwards and overflowed to the degassing zone from the riser 1 for sufficient degassing, preventing that excessive entrained bubbles enter the hydrocyclone from the downcomer to affect the separation performance of the hydrocyclone. The degassed slurry entered the downcomer and flowed downwards into the hydrocyclone in which the slurry entering via the inlet thereof was subjected to solid-liquid separation under the action of centrifugal force. Calcium carbonate whiskers having diameters of 0.5-1 μm and a length-diameter ratio of more than 30 were discharged through the underflow port 42, while calcium carbonate crystals having a diameter of less than 0.5 and a length-diameter ratio of less than 30 were returned via the overflow port to the reactor to circulate for reactive crystallization. The valve 43 was adjusted so that the discharge flow rate was equal to the feed flow rate to maintain a constant liquid level in the reactor.

The principles and examples of the present disclosure have been described in this specification using specific examples. The above examples are only used to help understand the method of the disclosure and its core idea. Meanwhile, it would be possible for those skilled in the art to make changes in specific implementations and the scope of the application according to the teachings of this disclosure. To sum up, the contents of this specification should not be construed as limitations to the disclosure.

What is claimed is:

1. An external circulating slurry reactive crystallizer, comprising
    a riser,
    a degassing zone; and
    a downcomer, wherein a lower end of the riser communicates with a gas inlet pipe, a liquid inlet pipe and a solid feeding pipe, while an upper end of the riser communicates with a lower end of the degassing zone which is open at the top; an upper end of the downcomer is fixed to a sidewall of the degassing zone and the downcomer communicates with the degassing zone; wherein at least one hydrocyclone is arranged at a lower end of the downcomer and the downcomer communicates with the hydrocyclone; the hydrocyclone is provided with an overflow port at an upper end thereof and an underflow port and a valve at a lower end thereof; the valve is used for controlling the flow rate of the underflow port; and the overflow port communicates with the riser, thereby allowing a crystallization mother liquor containing a small-particle crystallized product to enter the riser through the overflow port.

2. The external circulating slurry reactive crystallizer of claim 1, wherein the gas inlet pipe is arranged on a bottom surface of the riser, said gas inlet pipe and extends from the bottom surface of the riser away from the riser; the liquid inlet pipe is arranged on a sidewall of the riser and close to the gas inlet pipe, and extends from the sidewall of the riser away from the riser; and wherein the solid feeding pipe is located above the liquid inlet pipe and extends from the sidewall of the riser away from the riser and the liquid inlet pipe.

3. The external circulating slurry reactive crystallizer of claim 2, wherein an integrated gas-liquid distributor is arranged at the bottom of the riser to disperse an incoming gas from the gas inlet pipe and an incoming liquid from the liquid inlet pipe.

4. The external circulating slurry reactive crystallizer of claim 3, wherein a dispersion shell is arranged on the integrated gas-liquid distributor; a liquid inlet is formed in one sidewall of the dispersion shell, wherein the liquid inlet pipe communicates with the interior of the dispersion shell.

5. The external circulating slurry reactive crystallizer according to claim 1, wherein the degassing zone comprises a transition section and an expansion section, wherein an upper end surface of the transition section comprise an inner diameter substantially equivalent to the expansion section, said expansion section comprising a hollow cylinder and said transition section comprising a hollow inverted circular truncated cone, and the riser comprises a hollow cylinder; wherein the expansion section has an inner diameter larger than that of the riser; a lower end of the transition section is fixed to and internally communicated with the upper end of the riser; a lower end surface of the transition section has an inner diameter substantially equal to an upper end surface of the riser; an upper end of the transition section is fixed to and communicates with a lower end of the expansion section; the lower end of the expansion section is higher than the upper end of the downcomer, and the upper end of the expansion section is open.

6. The external circulating slurry reactive crystallizer of claim 5, wherein the upper end of the riser is flush with the lower end of the transition section.

7. The external circulating slurry reactive crystallizer of claim 5, wherein the upper end of the riser extends into the degassing zone, and is positioned above the lower end of the transition.

8. The external circulating slurry reactive crystallizer of claim 1, wherein the downcomer comprises an inclined section and a vertical section; an upper end of the inclined section is fixed to and internally communicates with the degassing zone, and a lower end of the inclined section is fixed to and internally communicates with an upper end of the vertical section; the lower end of the vertical section further communicates with the upper end of the hydrocyclone, thereby allowing slurry in the downcomer to enter the hydrocyclone through the upper end of the hydrocyclone for solid-liquid separation.

9. The external circulating slurry reactive crystallizer of claim 1, wherein the overflow port is formed in the center of the hydrocyclone, and an overflow pipe is arranged above the overflow port; the overflow pipe extends from the overflow port away from the hydrocyclone and is communicated with the riser through a connecting pipe; and the valve is arranged above the underflow port.

10. The external circulating slurry reactive crystallizer of claim 9, further comprising two hydrocyclones.

11. The external circulating slurry reactive crystallizer of claim 3, further comprising a plurality of intercommunicating holes formed in the top surface of the dispersion shell, wherein the dispersion shell communicates with the riser via the intercommunicating holes; wherein an aeration needle is correspondingly arranged in each intercommunicating hole, such that a bottom end of the aeration needle is fixed to the bottom surface of the dispersion shell, and a top end of the aeration needle extends upwards through the intercommunicating hole; such that the aeration needles allow the gas inlet pipe and the riser to communicate with each other; the aeration needle having a diameter smaller than an inner diameter of the intercommunicating hole.

* * * * *